United States Patent [19]
Hyer et al.

[11] 3,960,225
[45] June 1, 1976

[54] CONVEYOR BELT SYSTEM WITH POSITIONAL TRANSFORMATION OF WEIGHT DATA

[75] Inventors: Frank S. Hyer, Duxbury; Raymond Karosas, Quincy, both of Mass.

[73] Assignee: Hyer Industries, Inc., Pembroke, Mass.

[22] Filed: Aug. 5, 1974

[21] Appl. No.: 495,068

Related U.S. Application Data

[63] Continuation of Ser. No. 418,088, Nov. 21, 1973, abandoned.

[52] U.S. Cl. .................................. 177/121; 177/25; 177/50; 235/151.33; 177/70
[51] Int. Cl.² ........................................ G01G 13/04
[58] Field of Search .............. 177/1, 16, 52, 70, 80, 177/116–123; 235/151.33; 222/55

[56] References Cited
UNITED STATES PATENTS

| | | | |
|---|---|---|---|
| 2,997,175 | 8/1961 | Gordon | 177/16 |
| 3,165,195 | 1/1965 | Sass et al. | 177/121 |
| 3,225,848 | 12/1965 | Wise et al. | 177/80 |
| 3,311,182 | 3/1967 | Rusnack et al. | 177/119 |
| 3,477,529 | 11/1969 | Burn et al. | 177/70 |
| 3,494,507 | 2/1970 | Ricciardi | 177/121 |
| 3,868,643 | 2/1975 | Bullivant | 177/25 |

*Primary Examiner*—L. T. Hix
*Assistant Examiner*—Vit W. Miska
*Attorney, Agent, or Firm*—Kenway & Jenney

[57] ABSTRACT

A scale position compensation means for a conveyor belt material transport system, the system including a conveyor belt having a tail end and a discharge end, belt drive means, and a weight signal generating means. Belt travel signal generating means produce a belt travel signal representing the change of belt position. The weight signal generating means produce a first digital weight signal representing a weight of material associated with a portion of the belt adjacent to a first reference point located between the tail and discharge ends. The scale position compensation means are responsive to the first digital weight signal and the belt travel signal to produce a second digital weight signal representing a weight of material associated with the above-mentioned portion of the belt when it is adjacent to a second reference point located between the first reference point and the discharge end. The compensation means comprise a memory for storing the first digital weight signal for a time interval having a duration related to the rate of change of belt position and to the distance between the first and second reference points.

35 Claims, 4 Drawing Figures

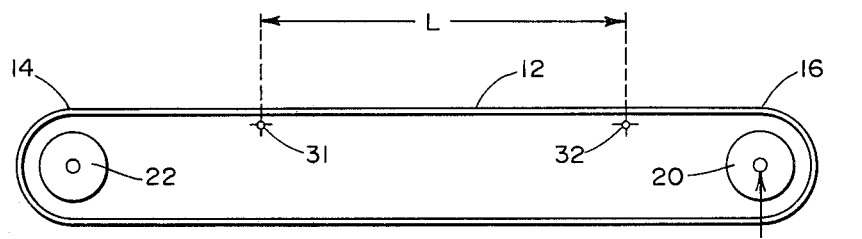
FIG. 1
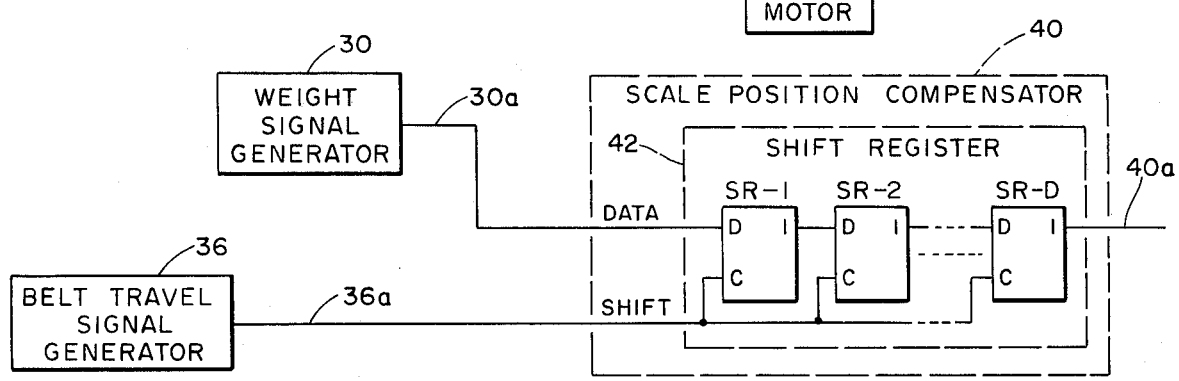
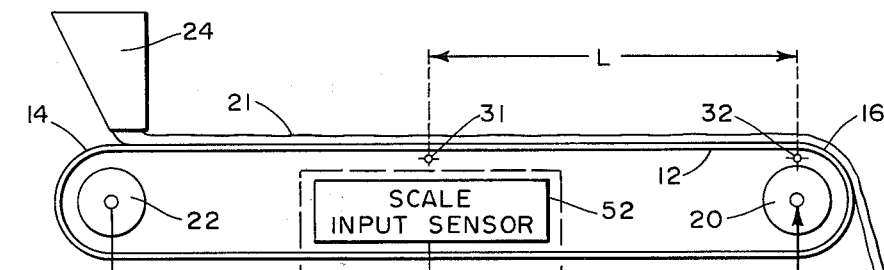
FIG. 2
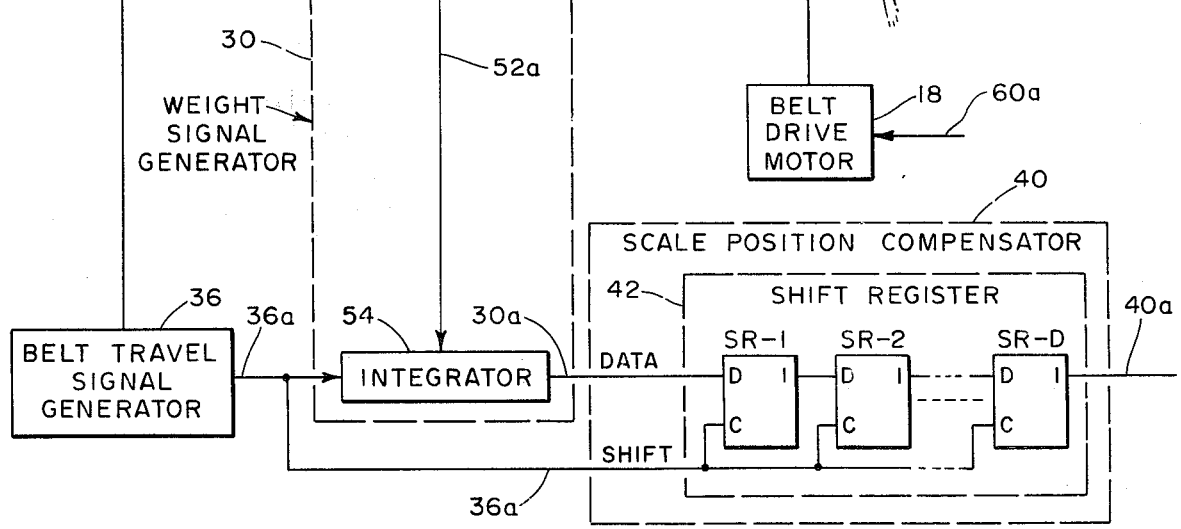

CONVEYOR BELT SYSTEM WITH POSITIONAL TRANSFORMATION OF WEIGHT DATA

CROSS REFERENCE TO RELATED APPLICATION

This application is a continuation of application Ser. No. 418,088, filed Nov. 21, 1973, now abandoned.

BACKGROUND OF THE INVENTION

The present invention relates generally to material transport systems and more particularly to conveyor belt systems.

In many conveyor belt applications it is desirable to measure or control the weight of material moving past a first reference point on a belt, which material is delivered downstream to a second reference point on the belt, usually the discharge end. Consequently, substantial effort has been expended to develop accurate conveyor belt scales which utilize an input sensor at the first reference point for producing an output signal related to the weight of material on an associated portion of the belt. Examples of such scales are the Thayer Series RF Belt Scales manufactured by Hyer Industries, Inc., the assignee of the present invention. Scales of this type permit in-motion weighing for weight totalizing and flow rate control in material transport systems. In many applications such scales are used in a system incorporating an electronic integrator which receives weight signals from a belt scale and a belt speed signal from the conveyor belt drive means. The integrator intregates the product of these two signals and provides an output signal which is indicative of the weight of material that passes on the portion of the belt associated with the scale input sensor. Electronic integrators of this type are well known in the art, and may be of the form shown in U.S. Pat. No. 3,610,908 to Raymond Karosas, dated Oct. 5, 1971 and assigned to the assignee of the present invention.

U.S. Pat. No. 3,559,451 to Frank S. Hyer and Raymond Karosas, dated Feb. 2, 1971, and assigned to the assignee of the present invention, describes a totalizing and flow rate measuring system which includes an integrator of the type noted above to generate a digital weight signal which is subsequently processed to produce output signals or indications representative of the cumulative weight and the instantaneous flow rate of material on the belt which passes the input sensor of the scale.

In the conveyor belt material transport systems known in the art, as described above, a substantial problem may arise from the choice of the belt scale input sensor location between the tail and discharge ends of the belt.

This problem results from the conflicing requirments of in-motion weight measurement on the one hand, and of providing accurate data on material delivery or correlation with external processes on the other hand. From the standpoint of in-motion weight measurement, the optimum location of the scale input sensor for accurate measurement is at the point of least belt tension in the conveyor, allowing for the material to settle in stable form on the belt priot to reaching the scale input sensor. This requirement dictates the placement of the scale input sensor near the tail end of the conveyor belt. With the scale input sensor so located, any cumulative weight measurement or flow rate measurement is related to a position remote from the discharge end. Therefore, such a system does not reflect the quantity of material on the belt portion between the sensor and the discharge end or variations in the material loading along that portion of the belt. The resulting inaccuracies are referred to herein as problems of transport lag. The material being delivered by the conveyor transport system to an external process or to a receiving container (e.g., a truck or railroad car) is that which is discharged from the head pulley or discharge end. Therefore, from the standpoint of accuracy in material delivery or external process, the optimal position for the scale input sensor would be at the discharge end. However, in certain applications, when the input sensor of a belt scale is positioned near the relatively high tension discharge end of a conveyor belt, the accuracy of the scale is substantially impaired.

In the prior art, the usual practice has been to position the scale input sensor near the lower tension tail end whenever the input weighing accuracy is of primary importance (e.g., plus or minus one-half percent or better), to position the scale near the higher tension discharge end (and bearing with the resulting scale inaccuracies) when the output weighing accuracy is of primary importance, and to position the scale at some intermediate point selected to compromise between the conflicting requirements when they are of more nearly equal importance. In implementing such a tradeoff, the loss in performance accuracy due to both effects is a substantial drawback in certain prior art conveyor belt material transport systems.

A further difficulty arises in certain prior art systems where the configuration of the conveyor belt does not permit the positioning of a scale input sensor in an appropriate position relative to the belt. In such systems s weigh feeder, such as the Thayer Series MXL weigh feeder manufactured by Hyer Industries, Inc., may be used to deliver the material to the conveyor belt. A weigh feeder typically comprises a belt scale and a relatively short conveyor belt having substantially none of the scale accuracy and transport lag problems associated with the relatively long main conveyor belt. The drive means of the weigh feeder belt are driven by a demand weight signal which represents the desired weight of material to be fed to the main belt from the discharge end of the weigh feeder belt. However, even when the weight of material added to the main belt in this manner is accurately measured and controlled by the weigh feeder, the system may have inaccuracies due to transport lag as will be clear from the following description. These difficulties are a consequence of the inability to identify the precise time at which each portion of material added by the weigh feeder has reached a particular downstream point on the main belt.

SUMMARY OF THE INVENTION

Accordingly, it is an object of this invention to provide a conveyor belt material transport system having means for generating a signal representative of a weight of material associated with a portion of the belt adjacent to a first reference point between the tail and discharge ends of the belt, and having a means for generating a signal representative of a weight of material associated with that portion of the belt when it is adjacent to a second or downstream reference point. The first-mentioned signal may be generated by actually measuring the weight of material on the belt, as by a belt scale, or by generating a signal independently of the weight of material on the belt, as by a source of demand pulses representing the weight of material to be placed on the belt.

In accordance with the present invention, a conveyor belt material transport system is provided with a scale position compensating means. The conveyor belt transport system includes a conveyor belt having a tail end, a discharge end, a belt drive means and a weight signal generating means. The weight signal generating means produces a first digital weight signal representative of a weight of the material associated with a portion of the belt adjacent to a first reference point located between the tail and discharge ends. The system also includes a belt travel signal generating means which produces a belt travel signal representative of the change of position of the belt.

The scale position compensation means are responsive to the first digital weight signal and the belt travel signal to produce a second digital weight signal representing a weight of material associated with the above-mentioned portion of the belt when it is adjacent to a second reference point located between the first reference point and the discharge end. The compensation means comprise a memory for storing the first digital weight signal for a time interval having a duration related to the rate of change of belt position and to the distance between the first and second reference points.

In one embodiment the scale position compensator comprises a multiple stage shift register. In this embodiment, the belt travel pulse signal is in the form of a sequence of pulses, wherein each pulse represents a predetermined distance of belt travel. The belt travel signal is used as the shift signal for the shift register and is effective to shift the first digital weight signal through the multiple stage register. The number of stages, D, required for the shift register is defined by the equation:

$$D = NL,$$

where $N$ is the number of pulses generated by the belt travel pulse generator for each foot of belt travel and $L$ is the distance in feet between the first reference point and the downstream second reference point.

The output signal of the last stage of the shift register is the second digital weight signal and is thus a delayed representation of the first digital weight signal. The delay is precisely matched with the distance between the reference points so that the shift register output signal represents a weight of material associated with the same portion of the belt that was represented by the first digital weight signal, but is produced when the portion of the belt is adjacent to the second reference point.

The weight signal generating means may comprise a belt scale having an input sensor associated with the portion of the belt located at the first reference point, and a digital flow integrator means responsive to the sensor output weight signal and to the belt travel signal to produce the first digital weight signal. The scale sensor may be positioned near the low tension tail end of the conveyor belt. The second digital weight signal produced at any given moment by the scale position compensation means is representative of the weight of material then located at the discharge end of the conveyor belt (i.e. the second reference point) since that signal is a delayed form of the first digital weight signal and the delay is precisely matched with the belt motion.

BRIEF DESCRIPTION OF THE DRAWINGS

FIG. 1 shows a conveyor belt material transport system embodying the present invention.

FIG. 2 shows an alternative form of the system of FIG. 1.

DESCRIPTION OF THE PREFERRED EMBODIMENT

Figure 3:
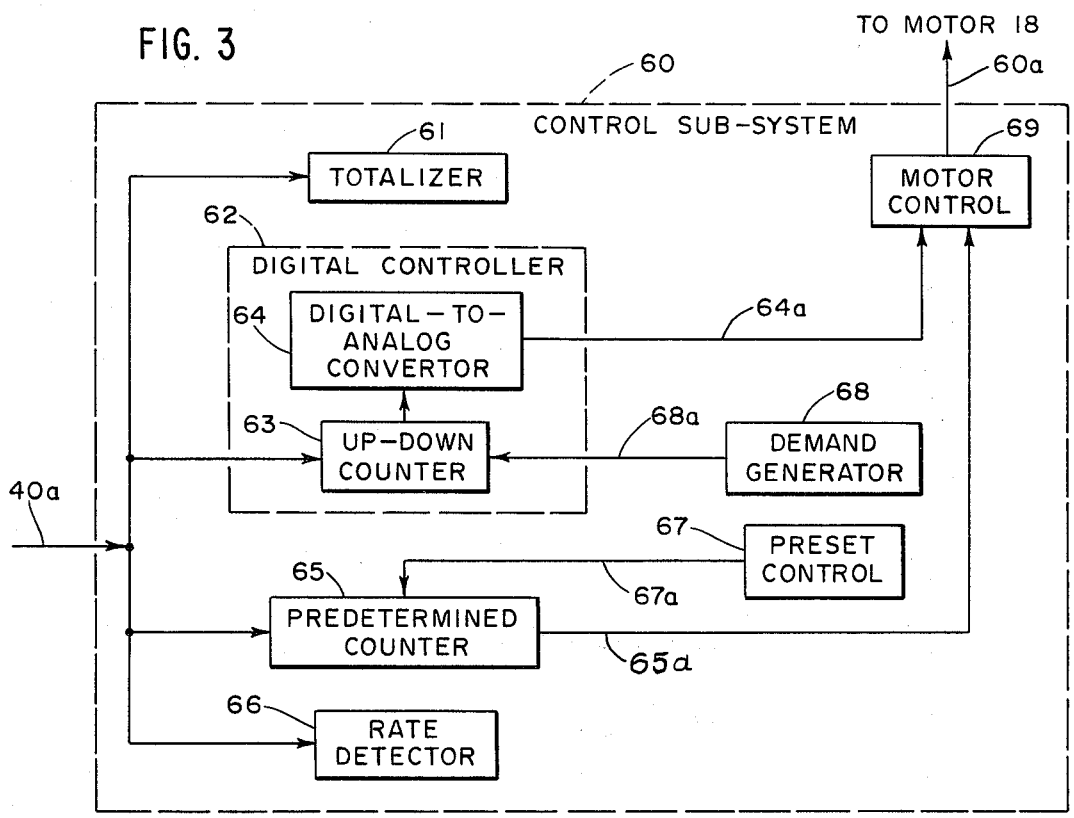
FIG. 3 shows a control sub-system for use with the system of FIG. 2.

FIG. 1 shows an embodiment of a conveyor belt material transport system in accordance with the present invention. A conveyor belt 12 has a tail end 14, a discharge end 16, and a belt drive means or motor 18 at the discharge end. The drive motor 18 may comprise, for example, a d.c. motor connected to the discharge end pulley 20. A second pulley 22 is located at the tail end 14 of the belt. In operation, the belt drive means 18 drives the pulley 20 which, in turn, produces a motion in the belt 12 so that material deposited on the top surface of the belt 12 is transported in a direction toward the discharge end 16.

A weight signal generator 30 provides a first digital weight signal on a line 30a which is representative of a weight of material associated with a portion of the belt 12 adjacent to a first reference point 31 located between the tail and discharge ends 14 and 16 of the belt.

The first digital weight signal may represent the weight information in any one of several digital forms in accordance with known techniques. It is applied by way of a line 30a to a first input terminal of scale position compensation means 40.

The scale position compensation means 40 includes a memory means comprising a multiple stage shift register 42 which is adapted to shift the first digital weight signal applied via the line 30a in response to belt travel signal pulses generated by a belt travel signal generator 36 and applied via a line 36a. The last stage of the shift register 42 produces a second digital weight signal on a line 40a, the second digital weight signal being representative of a weight of material associated with the same portion of the belt 12 when that portion is adjacent to a second reference point 32.

The belt travel pulse generator 36 may be coupled to be tail end pulley 22, and produces an output belt travel signal comprising a sequence of pulses on the line 36a. The belt travel signal pulses are thus generated by movement of the belt. Alternatively, they may be generated by the power frequency if the drive means comprise a synchronous motor. The repetition rate of the pulses on the line 36a is directly proportional in either case to the belt velocity past the pulley 22. For example, the generator 36 may generate one hundered pulses per foot of belt travel, in which case the number of pulses generated per second by the generator 36 is one hundred times the belt speed in feet per second. The line 36a is connected as a second input to the scale position compensator 40.

In the embodiment of FIG. 1 the first digital weight signal represents the momentary weight of material on a portion of the belt adjacent to the reference point 31, and it is this information which passes through the scale position compensator 40. FIG. 2 shows a particular embodiment in which the information passing through the scale position compensator is in the form of pulses each representing a specific weight of material. A loading hopper 24 is positioned near the tail end 14 for depositing material 21 on the top surface of the belt 12. The first reference point 31 is positioned near the tail end 14 but downstream from the hopper 24. The second reference point 32 is positioned at the discharge end 16 of the belt. It will be understood that elements in FIG. 2 which are the same as corresponding elements in FIG. 1 are denoted by the same reference numerals.

The weight signal generator 30 in FIG. 2 includes an inmotion belt scale input sensor 52 and a digital flow integrator 54. The sensor 52 is associated with a portion of the belt 12 adjacent to the first reference point 31. The effective center line passing through the input sensor 52 and perpendicular to the top surface of the belt 12 is located a predetermined distance L from the second reference point 32 located on a center line of the pulley 20 which passes through the rotational axis of the pulley and perpendicular to the top surface of the belt.

The scale input sensor 52 may be of the Thayer Series RF Belt Scale type manufactured by Hyer Industries, Inc. Such scale systems comprise an accurate weighbridge constructed of steel to provide rigidity and of minimum surface area on which material can accumulate. The Series RF scales further include means for mass counterbalancing of dead loading such as scale parts, belting weight and scale idlers so that the scale input sensor produces a d.c. output signal proportional in amplitude to the net weight of the material on the portion of belt 12 associated therewith.

The scale 52 produces an analog weight signal on a line 52a which signal may be, for example, a d.c. voltage having an amplitude proportional to the weight of material 21 per unit length of the belt 12.

The analog weight signal on the line 52a is applied to a first input terminal of the integrator 54.

The integrator 54 also receives a belt travel signal comprising a sequence of pulses having a repetition rate proportional to the velocity of the belt, each pulse representing a predetermined distance of belt travel.

The integrator 54 produces a first digital weight signal on the line 30a. This signal is generated from the integration of the product of the analog weight signal and the belt travel signal. From the resultant signal a sequence of pulses is generated on the line 30a having a repetition rate proportional to the mass flow rate of the material passing the scale sensor 52. Thus the integrator 54 generates a first digital weight signal wherein each component pulse represents a predetermined unit of weight of material 21 on the belt 12 which has passed the scale input sensor 52. Such integrators are well known in the art. For example, the integrator may comprise a Thayer I-128 Digital Flow Integrator manufactured by Hyer Industries, Inc.

The first digital weight signal pulses from the integrator 54 may be used for a number of purposes. For example, they may be applied to a totalizing counter (not shown) which produces an output signal or indication of the cumulative weight of the material passing the scale input sensor 52. Alternatively, the first digital weight signal may be transformed to a time rate signal representative of the amount of tonnage (or other weight unit) of material being transported per hour past the scale input sensor 52. In some embodiments the first digital weight signal on the line 30a may be compared with an independently produced reference flow signal in a "demand" control system. Such systems are well known in the art and are not shown in FIG. 2 to avoid complication of the drawing.

Briefly, the comparison produces an output control signal for a controller modifying the signal to the belt drive means 18. The control signal is based on an error signal between the reference or demand signal and the first digital weight signal and compensates for the error. In this manner a closed loop demand feed system may be provided which assures a predetermined rate of flow past the scale input sensor 52.

The material transport system thus far described with reference to FIG. 2 is well known in the art. As noted above, the position of the scale input sensor 52 has created a substantial problem in certain instances. The usual practice has been to achieve a trade-off of the transport lag and the scale accuracy considerations by positioning the scale input sensor somewhere between the lower tension tail end 14 where scale weighing accuracy would be greatest and the higher tension discharge end 16 where transport lag would be eliminated. By the addition of the scale position compensation means in accordance with the present invention, this scale positioning trade-off is obviated. The compensation means 40 comprise a memory element which may be in the form of a multiple stage digital shift register 42, as in FIG. 1. For example, in FIGS. 1 and 2 the register 42 comprises a series of type D flip-flops with the shift input connected to the line 36a and the data input connected to the line 30a. The first digital weight signal from the line 30a is applied to the first shift register stage SR-1, and is shifted from stage to stage through the register 42 by the digital belt travel signal produced on its line 36a by the generator 36. A second digital weight signal is applied on the line 40a from the last shift register stage SR-D. It will be understood that the pulse repetition rate of the shift signal is at least twice that of the first digital weight signal so that no information in the latter signal is lost during the storage operation.

In the embodiment of FIG. 2 the first digital sensor weight signal from the line 30a, representing unit weight increments of the material 21 passing over the input sensor 52, is stored in the compensator 40 for a time interval equal to the transit lag in the delivery of the material from the reference point 31 adjacent to the effective center line of the scale input sensor 52 to the reference point 32 at the discharge end 16 of the conveyor belt 12. By utilizing a shift register for the memory means, and shifting the first digital weight signal through that register by means of the belt travel pulses, a precise delay is achieved to compensate exactly for the position of the input scale sensor 52 relative to the reference point 32. Consequently, each pulse of the shift register 42 output, i.e. the second digital weight signal on line 40a, is representative of a unit weight increment of material 21 passing the reference point 32. The number of shift register stages D is determined in the same manner described above with reference to FIG. 1.

In FIG. 2 the belt travel signal generator 36 is coupled directly to the pulley 22. The generator 36 may be a rotary shaft position encoder connected to the shaft of the pulley 22. A suitable encoder is a Type T rotary pulse generater maufactured by Trump-Ross Industrial Controls, Inc. Alternatively, as stated above, the belt drive motor 18 may be synchronized to the power line frequency and thus operate at a constant speed. In the latter alternative the belt speed is proportional to the frequency of the power line and the belt travel pulse generator 36 may be connected to the power line to generate a clock signal at a frequency proportional to the power line frequency.

Thus the generator 36 may or may not have a connection to the tail end pulley 22 of the belt or other parts of the belt drive mechanism. The number of shift register stages required in the scale position compensator 40 is in any case a function of the repetition rate of the clock signal generated by the pulse generator 36 and the distance L. If the transport system is such that the belt may move at other than a constant speed, then the number of shift register stages is determined by providing a belt travel signal pulse for each unit distance of belt travel and computing the number of units of travel in the length L.

As an alternative to the use of the integrator 54, the weight signal generator may include only a scale input sensor and the output of this sensor may comprise the first digital weight signal. In such case, the second digital weight signal produced on the line 40a may then be applied to an integrator of the type described above. This integrator may also be operable by a belt travel signal to produce a third digital weight signal comprising pulses of the type described above, and these pulses will relate to unit weight increments at the point 32.

FIG. 3 shows an exemplary control sub-system 60 for connection with the conveyor belt system of FIG. 2. The sub-system 60 includes an input connection to the line 40a from the scale position compensator 40 of FIG. 2, and an output connection 60a to the belt drive motor 18 of FIG. 2. The control system 60 includes a totalizer 61, a digital controller 62, a predetermined counter 65 and a rate detector 66, all connected to the input line 40a.

The digital controller 62 includes an up-down counter 63 having its output connected to a digital-to-analog converter 64. The line 40a is connected to a count-down input of the up-down counter 63.

The counter 63 has a second, count-up input connection on a line 68a from a demand generator 68. The output of the converter 64 is applied to a motor control means 69 having its output applied by a line 60a to the belt drive motor 18 to control its speed.

The line 40a is connected to the count input of the predetermined counter 65. The present input of the counter 65 is connected to a present control 67 via a line 67a. The output of the counter 65 is connected by way of the control 69 and the line 60a to the belt drive motor 18.

In operation, as described in conjunction with FIG. 2, the second digital weight signal on the line 40a from the last shift register stage of the compensator 40 is a series of pulses, each pulse having entered the first stage representing a unit weight of material 21 on the portion of the belt 12 adjacent to the scale sensor 52. Since the shift register compensating means 40 has the appropriate number of stages to accommodate the transport lag resulting from the belt movement over the distance L between the first reference point 31 and the second reference point 32, the totalizer 61 provides a measure of the cumulative weight which has been delivered at the discharge end 16 of the belt 12.

The compensator 40 output pulse sequence on the line 40a is also applied to the rate detector 66. This detector is effective to provide an output signal representative of the repetition rate of the pulses in the second digital weight signal on the line 40a, and is therefore a measure of the flow rate of the material 21 passing the discharge end 16 of the belt 12.

The digital controller 62 and the predetermined counter 65 permit the material transport system to perform in either or both of two modes: first, delivery of a predetermined total weight of material 21 at the discharge end 16 and, second, delivery of the material 21 at a predetermined rate at the discharge end 16.

In the first mode the counter 65 is utilized. This counter is preset to a count state corresponding to the desired number of weight units of material 21 to be delivered. This is accomplished by an appropriate signal on the line 67a. As material is delivered to the discharge end 16, as indicated by pulses on the line 40a, the counter 65 counts down toward the zero state from the preset state. When the counter 65 reaches the zero state, the desired amount of material 21 has been delivered at the discharge end 16. The motor control 69 includes logic circuitry of a type already known in the art and effective to determine when the counter 65 is in a non-zero state, to signal this state by means of a counter 65 output signal on a line 65a, and to generate an appropriate signal on the line 60a to energize the motor 18. When the counter 65 reaches the zero state the control 69 applies a disabling signal to the motor 18. Thus the control 69 provides a "go-no go" control. In this mode of operation, the counter 65 is preset to indicate the demanded amount of the material 21 to be delivered, and the belt drive motor 18 is driven in response thereto so that the belt 12 continuously delivers material to the discharge end 16 until the counter 65 has counted down in decrements to its zero state, indicating that the demanded amount of material 21 has been delivered at the discharge end 16.

In the second mode of operation of the system of FIGS. 2 and 3, the digital controller 62 is utilized. The demand generator 68 applies a sequence of pulses via the line 68a to the count-up input of counter 63 at a repetition rate corresponding to a desired flow rate at the second reference point 32. These demand pulses advance the counter 63 in increments upward from its zero state. As material 21 is delivered to the discharge end 16, the scale position compensator 40 applies the second digital weight signal to the count-down input of the counter 63.

The convertor 64 includes appropriate circuitry to transform the output signal from the counter 63 to an "error" analog signal on the line 64a, the amplitude of the analog signal being related to the count state of the counter 63. The convertor output signal is applied to the control 69 which in turn provides a driving signal for the motor 18. The motor 18 drives the belt 12 at a speed which is related to the "error" signal produced by the counter 63, this signal speeding up or slowing down the motor 18 as may be necessary to cause the material to be delivered at the demand rate. Thus the input demand rate is exactly matched by the discharge rate and a predetermined flow rate at the discharge end 16 of the belt is achieved.

Referring to FIG. 1, a weigh feeder may be used for depositing material on the belt at a predetermined rate and at any designated feed point thereon. This may be accomplished by means of a weigh feeder demand signal and a weigh feeder such as the Thayer Series MXL manufactured by the assignee of the present invention. The weigh feeder demand signal may comprise a sequence of pulses each representing a weight of material to be deposited at the feed point. These pulses may be delivered to a digital controller like the unit 62 in FIG. 3. The weigh feeder may be provided with a scale sensor, the output signal from which is also delivered to the digital controller. The digital controller may control the speed of the weigh feeder conveyor belt, and therefore the rate of material delivered to the feed point, in the same way that the motor 18 is controlled in the embodiment of FIG. 3. This arrangement may be utilized, for example, when blending two materials X and Y separately deposited at different feed points on the belt, the blending being accomplished in a predetermined weight proportion. Two specific multiple feed point embodiments are described below.

First, with reference to FIG. 1, assume that a wild flow of the material X, that is a flow occurring at a nonconstant rate, is added to the belt 12 at a point upstream from the first reference point 31, and further that a weigh feeder (not shown) is used to deposit the material Y at the second reference point 32. In this case the weight signal generator 30 associated with the point 31 includes a scale input sensor, an integrator and ratio control means for generating a first digital weight signal on the line 30a. This first digital weight signal is representative of the weight of the material Y to be added to the belt 12 as required to achieve the predetermined proportionality of the materials X and Y. For example, assume that the system has a digital weight signal comprising sequences of pulses wherein each pulse represents one pound of the associated material, and further that the predetermined weight ratio materials X to Y is two to one. In this case, through operation of the ratio control means, the generator 30 applies a single pulse on the line 30a for each two pounds of material X detected at the point 31 on the belt 12 by the scale sensor. Thus the first digital signal is derived from a measurement of the weight of the material X at the point 31. This signal is applied to the data input of the shift register 42. The belt speed travel signal on the line 36a is effective to shift the first digital weight signal through the register 42, to generate the second digital weight signal on the line 40a. This latter signal serves as the demand signal for the weigh feeder associated with the point 32. The first digital weight signal is delayed for a time interval having the precise duration to permit the material at the first reference point 31 to be transported to the second reference point 32. In response to the second digital weight signal applied as the weigh feeder demand signal, the weigh feeder deposits the corresponding weight of material Y on to the belt 12 at the reference point 32 at the precise time to achieve the predetermined proportion of the materials X and Y at the point 32 and at all points downstream thereof. Thus compensation is provided for the position of the scale sensor associated with the point 31 relative to the second feed point 32 in a manner permitting in-phase proportioning to a wild flow of the material X on the belt.

Figure 4:
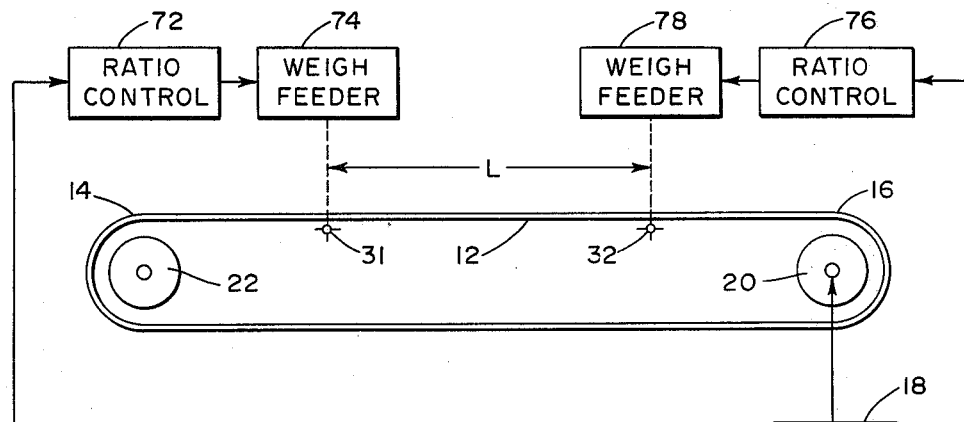
FIG. 4 shows another alternative embodiment.
Figure 4:
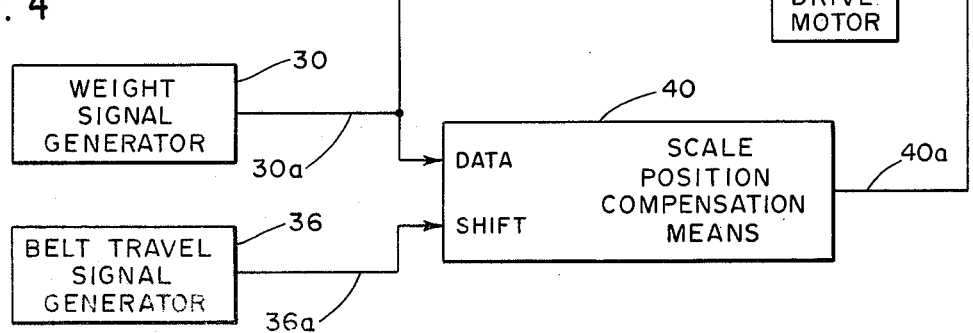

A second multiple feed point embodiment is shown in FIG. 4. This comprises a single belt blending system having two weigh feeders constructed and controlled as described above and positioned along the belt for delivering materials X and Y at the feed points 31 and 32, respectively, with a predetermined proportionate weight. The elements of the system of FIG. 4 which correspond to similar elements of FIG. 1 are identified with the same reference numerals. In the system of FIG. 4 the weight signal generator 30 comprises a demand generator which provides a first digital weight signal on the line 30a. This signal comprises a sequence of pulses wherein each pulse is representative of a predetermined composite weight of the materials X and Y which is desired to be delivered to the second reference point 32 and all points downstream thereof. The first digital signal is applied by way of a ratio control 72 to a weigh feeder 74 for discharging the material X at the point 31. The ratio control 72 performs an appropriate frequency division of the first digital signal to provide a weigh feeder demand signal, in response to which the weigh feeder 74 deposits the predetermined proportion of the material X at the point 31.

The first digital signal on the line 30a is also applied to the data input of the scale position compensation means 40. The belt travel signal generator 36 applies a belt travel signal via the line 36a to the shift input of the compensation means 40. The compensation means 40 may comprise a multiple stage shift register and functions in the same manner as the register 42 described above in conjunction with FIG. 1.

Accordingly, the shift register has the number of stages required to compensate for the transport lag encountered over the distance, L, between the points 31 and 32.

The second digital weight signal on the line 40a is applied by way of a ratio control 76 to a weigh feeder 78 whereby material Y is discharged therefrom at the point 32. The ratio control 76 performs an appropriate frequency division of the second digital signal to provide a weigh feeder demand signal, in response to which the weigh feeder 78 deposits the predetermined proportion of the material Y at the point 32. In this manner, the predetermined proportionate mixture of the materials X and Y is provided on the belt 12 at the point 32 and all points downstream thereof.

It will be understood that in this latter embodiment, the weight signal generator provides a first digital weight signal which corresponds to the composite weight of material to be deposited on the belt 12. That is, it is a demand signal that is not produced by the weight of material actually on the belt. The first digital weight signal is, as described, representative of the weight of material associated with the portion of the belt adjacent to the point 31 through the predetermined proportionality of the composite mixture of materials X and Y.

It will be further noted that this latter system accommodates start-up and shut-down of the demand generator in the generator 30 by maintaining the desired proportionality of materials X and Y during these periods. For example, during start-up the weight feeder demand signal for the material X is applied immediately to the weigh feeder 74 while the corresponding signal for the weigh feeder 78 is delayed for the precise time interval required to permit the initial deposits of the material X to reach the point 32.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. Apparatus for a belt conveying a stream of material thereon, said apparatus having, in combination, means to generate, at a time when a portion of the belt is adjacent a first reference point, a first weight signal associated with said portion, means to convert said signal to a stream of substantially uniform pulses including means to delay said pulse stream relative to said first weight signal for the time interval required for said portion to reach a position adjacent a second reference point downstream of the first reference point, said delayed pulse stream having an instantaneous pulse repetition rate proportional to the weight rate of flow of material associated with the portion of the belt adjacent the second reference point.

2. Apparatus according to claim 1, in which the means to generate the first weight signal include a belt scale responsive to the weight of the material on said portion of the belt adjacent the first reference point.

3. Apparatus according to claim 1, in which the means to generate the first weight signal include a demand generator and means operable thereby to vary the weight rate of flow of material on the belt adjacent the first reference point.

4. Apparatus according to claim 1, in which the means to delay said pulse stream comprise a shift register.

5. Apparatus according to claim 1 further having a means for generating a signal representative of the cumulative number of pulses comprising said delayed pulse stream.

6. Apparatus according to claim 1, in which the means to delay said pulse stream comprise a multi-stage shift register wherein each stage is adapted for digital representation of said first weight signal, and pulse means synchronized with the belt motion to advance said representation from stage to stage in the shift register.

7. Apparatus according to claim 6 further comprising an indicating means connected to the last stage of said shift register for indicating the representation therein.

8. Apparatus according to claim 1, including means to discharge material at a variable rate on to the belt at a position adjacent the second reference point, and means responsive to the delayed pulse stream and operable to vary the rate of discharge.

9. Apparatus according to claim 1, including means for discharging streams of material on to the belt at positions separated by at least the distance between said reference points, said means responsive to the delayed pulse stream to vary the rate of discharge at the downstream position.

10. Apparatus according to claim 1, including means for producing a belt travel signal synchronized with the belt motion, in which the means to delay said pulse comprises a memory for storing a digital representation of the first weight signal for a time interval related to the distance between said first and second reference points and to the belt travel signal.

11. Apparatus according to claim 4, including a source of belt travel pulses recurrent upon each unit distance of belt travel for shifting the shift register.

12. Apparatus according to claim 4, including a source of belt travel pulses recurrent upon each unit distance of belt travel, said means to convert said signal including an integrator responsive to said first weight signal and said belt travel pulses to generate said stream of uniform pulses.

13. Apparatus according to claim 12, wherein the output of the integrator is connected to the input to the shift register.

14. Apparatus according to claim 13, wherein the repetition rate of the belt travel pulses is at least twice that of said stream of uniform pulses.

15. Apparatus according to claim 6, wherein said pulse means produce belt travel pulses recurrent upon each unit distance of belt travel, said means to convert said signal including an integrator connected with the final stage of the shift register and responsive to said belt travel pulses to generate said stream of uniform pulses.

16. Apparatus according to claim 9, in which the means for discharging streams of material are respectively located at positions adjacent said second reference point and upstream of said first reference point.

17. Apparatus according to claim 9, in which the means to generate the first weight signal include a belt scale responsive to the weight of the material on said portion of the belt adjacent said first reference point.

18. Apparatus for a belt conveying a stream of material thereon having, in combination, means to generate, at a time when a portion of the belt is adjacent a first reference point, a first characteristic signal related to material associated with said portion, means to generate pulses recurrent upon each unit distance of belt travel, and means responsive to said signal and to the belt travel pulses to generate a stream of substantially uniform pulses, wherein each pulse in said stream represents a unit of weight of material associated with a portion of the belt adjacent a second reference point at the time of that pulse, said second reference point being downstream of said first reference point, wherein the means to generate the first characteristic signal comprise a belt scale having an input sensor adjacent said first reference point.

19. Apparatus according to claim 18, wherein the means responsive to said signal comprise a memory for storing said signal for a time interval related to the distance between said first and second reference points and the rate of belt travel.

20. Apparatus according to claim 19 in which the memory comprises a multiple stage shift register having a data input for receiving said first characteristic signal and a shift input for receiving said belt travel pulses, the number of stages being related to the number of belt travel pulses per unit distance traveled by the belt and the distance in said units between said first and second reference points.

21. Apparatus according to claim 20 in which the number of stages equals the product of said distance and said number of belt travel pulses per unit distance.

22. Apparatus for a belt conveying a stream of material thereon having, in combination, means to generate, at a time when a portion of the belt is adjacent a first reference point, a first characteristic signal related to material associated with said portion, means to generate pulses recurrent upon each unit distance of belt travel, and means responsive to said signal and to the belt travel pulses to generate a stream of substantially uniform pulses, wherein each pulse in said stream represents a unit of weight of material associated with a portion of the belt adjacent a second reference point at the time of that pulse, said second reference point being downstream of said first reference point, wherein the means to generate the first characteristic signal comprise a belt scale having an input sensor adjacent said first reference point for producing an intermediate weight signal, and signal conversion means responsive to said intermediate weight signal and said belt travel pulses to produce said first characteristic signal in digital form.

23. Apparatus according to claim 22, wherein the means responsive to said signal comprise a memory for storing the said first characteristic signal for a time interval related to the distance between said first and second reference points and the rate of belt travel.

24. Apparatus according to claim 23, in which the memory comprises a multiple stage shift register having a data input for receiving said first characteristic signal and a shift input for receiving said belt travel pulses, the number of stages being related to the number of belt travel signal pulses per unit distance traveled by the belt and the distance in said units between said first and second reference points.

25. Apparatus according to claim 24, in which the number of stages equals the product of said distance and said number of pulses per unit distance.

26. Conveyor belt blending apparatus having, in combination,
a conveyor belt and drive means therefor,
a plurality of feeders for depositing material at spaced feed points on the belt, at least one of said feeders having a controlled feed,
means to generate, at a time when a portion of the belt is adjacent a first reference point, a first weight signal associated with said portion, and
position compensation means operative in step with the belt travel to transform the first weight signal to a second weight signal produced at a time when said portion of the belt is adjacent said controlled feed, said controlled feed being operative in response to said second weight signal to vary the rate of flow of material to the belt.

27. The apparatus according to claim 26 wherein said second weight signal comprises a stream of substantially uniform pulses with each pulse in said stream representing a unit of weight of material associated with a portion of the belt adjacent said controlled feed at the time of that pulse.

28. Apparatus according to claim 26, wherein the position compensation means comprise a memory for storing the first weight signal for a time interval related to the distance between said first reference point and said controlled feed and to the rate of belt travel.

29. Apparatus according to claim 26, in which at least one of said feeders includes a feeder conveyor belt with drive means and a belt scale therefor, said generating means being operated by said belt scale to produce said first weight signal.

30. Apparatus for a belt delivering a stream of material from a discharge position thereon having, in combination,
adjustable speed driving means for the belt,
a belt scale having a sensor positioned at a first reference point on the belt upstream of said discharge position to generate a first weight signal associated with material on a portion of said belt adjacent to the sensor,
position compensation means operative in step with the belt travel to transform the first weight signal to a second weight signal, said second weight signal being associated with the material when said portion of said belt is adjacent to said discharge position,
means for generating a digital demand weight signal, and
control means responsive to said second weight signal and said demand weight signal to generate a belt motor drive signal for controlling the speed of said driving means.

31. The apparatus according to claim 30 wherein said second weight signal comprises a stream of substantially uniform pulses with each pulse in said stream representing a unit of weight of material associated with a portion of the belt adjacent said discharge position at the time of that pulse.

32. Apparatus according to claim 30, wherein said control means comprises an up-down counter having count-up and count-down input terminals, each of said second weight signal and said demand weight signal being connected to a separate one of said input terminals, and said digital-to-analog converter for producing a belt motor drive signal, said drive signal having an amplitude related to the count state of said counter.

33. Conveyor belt blending apparatus having, in combination,
a conveyor belt and drive means therefor,
a plurality of feeders having means for delivering material at variable rates at spaced feed points on the belt,
means for generating a digital demand weight signal,
a first control operable by the demand weight signal to control the delivery rate of a first feeder,
position compensation means operative in step with the belt travel and in response to the demand weight signal to produce a delayed weight signal and
a second control operable by the delayed weight signal to control the delivery rate of a second feeder downstream of said first feeder.

34. Apparatus according to claim 33, in which each of said feeders comprises a conveyor belt weigh feeder.

35. Apparatus according to claim 33, in which the position compensation means is adapted to produce a delayed weight signal representing a weight of material to be delivered by said second feeder in predetermined proportion to the material at said second feeder deposited by said first feeder.

* * * * *